Jan. 8, 1963  W. E. PETERSON ETAL  3,072,073
TOW PIN MOUNTING FOR SUBFLOOR CONVEYOR SYSTEM
Filed July 31, 1961  3 Sheets-Sheet 1
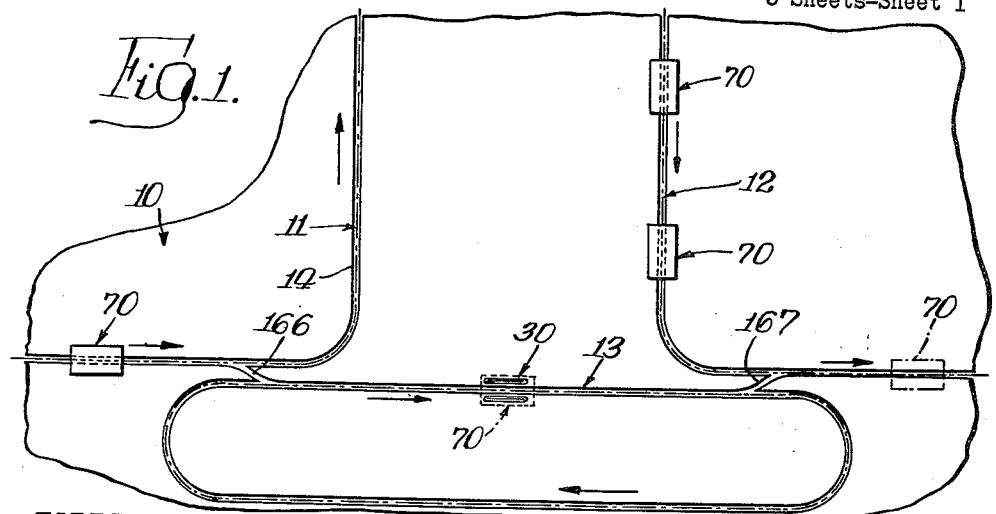
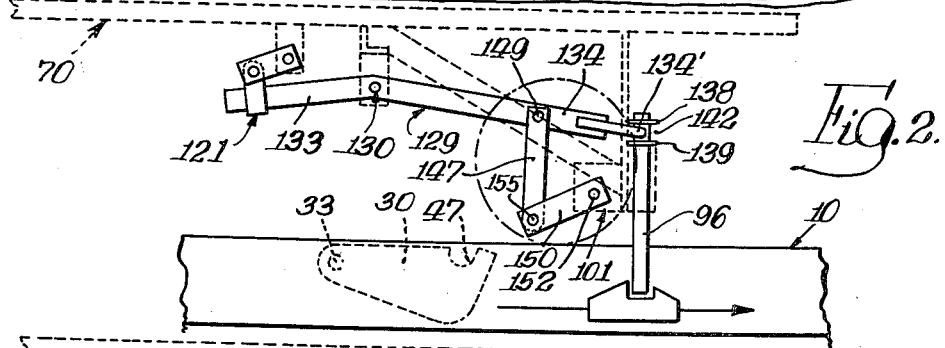
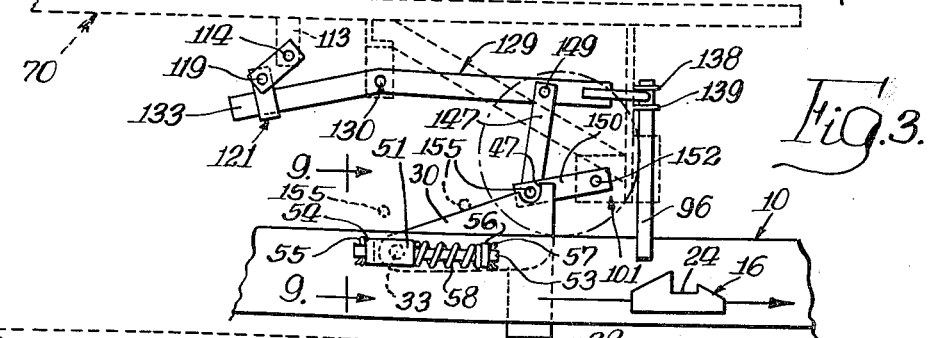
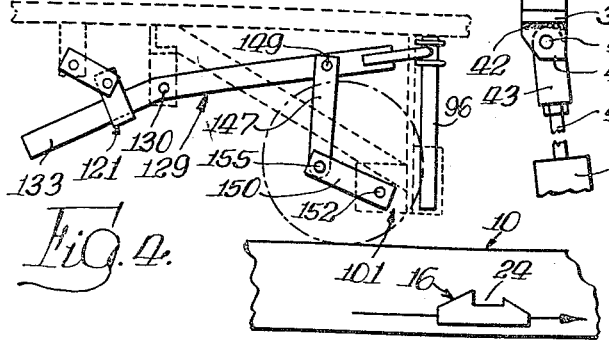
INVENTORS.
Ward E. Peterson
BY Harry R. Stokes
Davis, Lindsey, Hibben & Noyes
Attys Jan. 8, 1963   W. E. PETERSON ETAL   3,072,073
TOW PIN MOUNTING FOR SUBFLOOR CONVEYOR SYSTEM
Filed July 31, 1961   3 Sheets-Sheet 2

INVENTORS.
Ward E. Peterson,
Harry R. Stokes,
BY
Davis, Lindsey, Hibben & Noyes
Attys.

Jan. 8, 1963  W. E. PETERSON ETAL  3,072,073
TOW PIN MOUNTING FOR SUBFLOOR CONVEYOR SYSTEM
Filed July 31, 1961  3 Sheets-Sheet 3

INVENTORS.
Ward E. Peterson,
Harry R. Stokes,
BY Davis, Lindsey, Hibben & Noyes
Attys.

United States Patent Office 3,072,073
Patented Jan. 8, 1963

3,072,073
TOW PIN MOUNTING FOR SUBFLOOR
CONVEYOR SYSTEM
Ward E. Peterson, 1005 Meadow Lane, Topeka, Kans., and Harry R. Stokes, 17306 Holmes Ave., Hazelcrest, Ill.
Filed July 31, 1961, Ser. No. 128,192
10 Claims. (Cl. 104—172)

This invention relates to improvements in a subfloor conveyor system and more particularly to a novel and improved tow pin mounting and actuating means for use in such system.

The system with which this invention is concerned includes a dragline or drive line in the form of a cable or chain located beneath a floor surface over which a material handling truck is desired to be moved. The chain or cable is equipped with spaced apart trolleys or pusher dogs which are engaged by a depending element from the truck to be driven. Thus, with this system floor riding trucks may be driven by and along the path of the submerged drive lines. These systems are used in various shops and particularly railroad freight houses in the movement of heavy objects from one site to another.

A principal object of this invention is to provide novel and improved means for effecting automatic disengagement of a truck from a subfloor drive line.

An important object of this invention is the provision of novel and improved means in a subfloor conveyor system for stopping forward movement of a material handling truck at the time of disengagement from a subfloor dragline, said means being particularly advantageous in the case of relatively heavy trucks travelling at relatively high speeds.

Another important object of this invention is to equip a material handling truck for cooperation with a subfloor drive line with novel and improved means to automatically effect a raising and thus a disengagement of the truck tow pin from the subfloor drive line.

Another and further important object of this invention is to supply raising linkage for a material handling truck tow pin cooperating with a subfloor drive line which eliminates shock load from the tow pin either on engagement with or on disengagement from the subfloor drive line.

Still another important object of this invention is to provide a material handling truck for use in a subfloor conveyor system with a tow pin raising linkage having means spaced from the tow pin for engagement with a floor ramp to thus avoid direct engagement of the tow pin and possible damage thereto during automatic disengagement of the tow pin from the subfloor drive line of the conveyor system.

Still another important object of this invention is to provide a tow pin mounting for material handling trucks in a subfloor conveyor system including a strong framework flanking the lifting linkage of the tow pin such that the horizontal component of the stopping force on the truck is assumed by the framework rather than by the tow pin.

Other and further important objects and advantages will become apparent from the disclosures in the following specification and acompanying drawings.

In the drawings:

FIGURE 1 is a plan view of a portion of a floor containing a subfloor conveyor system.

FIGURE 2 is a diagrammatic side elevational view taken at the position of a material handling truck in engagement with a subfloor drive line.

FIGURE 3 is a view similar to FIGURE 2 with the material handling truck shown disengaged from the drive line by the automatic disengagement mechanism of this invention.

FIGURE 4 is another view similar to FIGURES 2 and 3 and showing the truck completely disengaged from the subfloor conveyor system.

Figure 5:
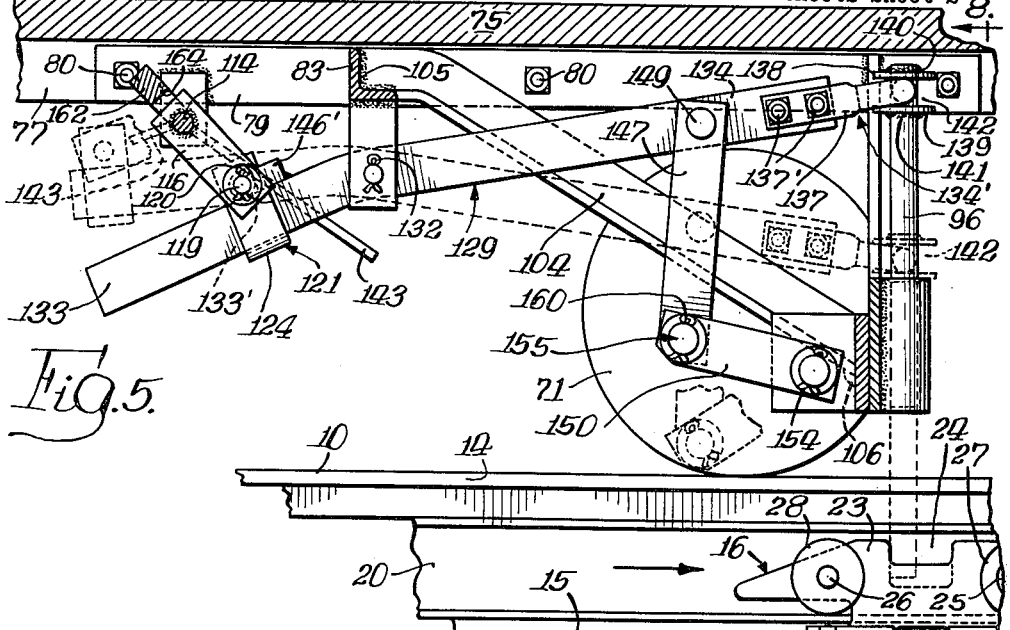
FIGURE 5 is an enlarged side elevational view, partly in section, of a portion of a material handling truck comprising one specific embodiment of the present invention and showing the relationship of elements comparable to the device as shown in diagrammatic form in FIGS. 2-4.

As shown in FIG. 1, the reference numeral 10 indicates generally a floor in a railroad freight house or the like in which there is included a first subfloor conveyor system shown at 11, a second subfloor conveyor system 12 and a small intermediately disposed conveyor loop 13 which is primarily for the purpose of interconnecting the systems 11 and 12. The paths of the conveyor systems are identified by a narrow opening or slot 14 in the surface of the floor 10. The transporting of a material handling truck from the system 11 to the system 12 through the intermediate conveyor system 13 will be later described in detail.

Figures 8, 9:
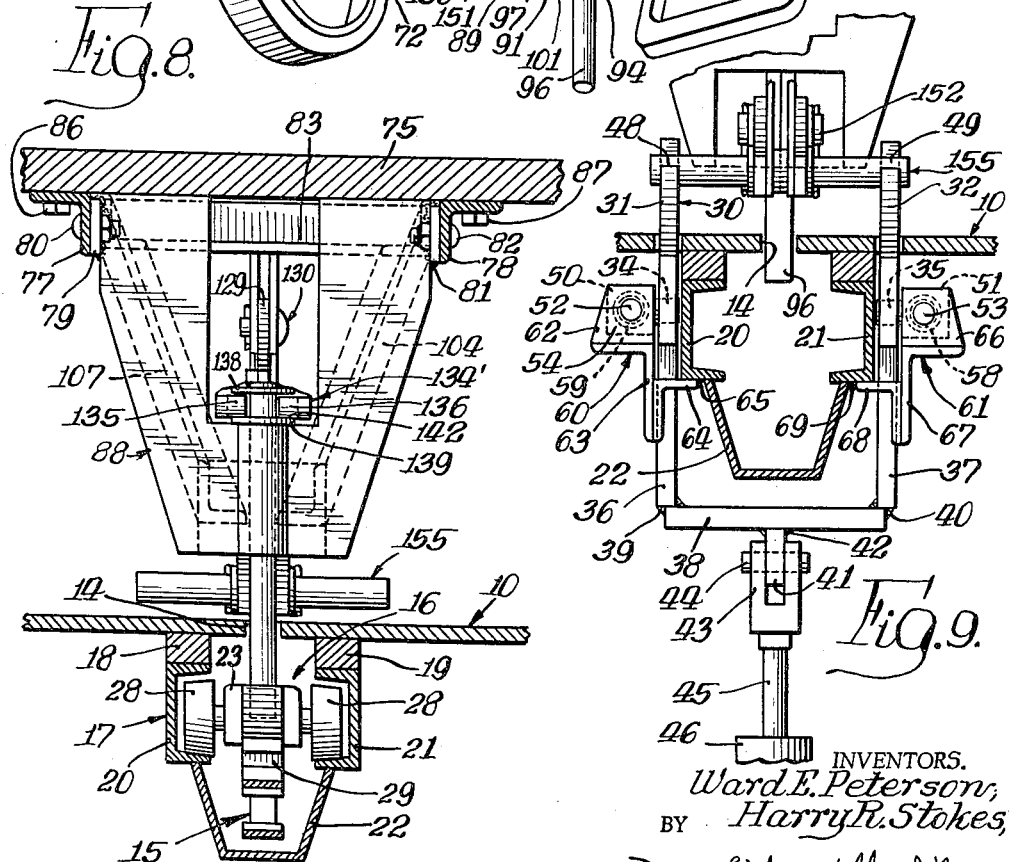
FIGURE 8 is a sectional view taken on the line 8—8 of FIGURE 5.
FIGURE 9 is a sectional view taken substantially on the line 9—9 of FIGURE 3.

The subfloor conveyor system, as shown specifically in FIGS. 5 and 8 and diagrammatically in FIGS. 2-4, includes an endless chain 15 located beneath the surface of the floor 10 at a position adjacent to and in alignment with the narrow slots 14 in the floor to permit driving engagement between the chain and material handling trucks which ride on the surface of the floor 10. The chain 15 is equipped at intervals with trolleys or pusher dogs 16 which constitute the means which are physically engaged by a depending element from the material handling truck to be driven. The chain and trolleys are provided with an elongated housing 17 (FIG. 8) which is located beneath the floor 10 and includes vertical spacer members 18 and 19 which are laterally spaced apart and flank both sides of the floor opening 14. Beneath the spacers 18 and 19 are inwardly opening channel members 20 and 21. The bottom of the housing is a substantially U-shaped member or trough 22 which spans the bottom beneath the inwardly opening channels 20 and 21 and contains the drive line chain 15.

The trolley or pusher dog 16 includes a carriage or body portion 23 (FIG. 5) with a generally centrally disposed upwardly opening recess 24 and forwardly and rearwardly inclined surfaces. The body portion 23 is equipped with longitudinally spaced apart transversely disposed shafts 25 and 26 having rollers 27 and 28 mounted on the ends thereof. These rollers 27 and 28 ride within the inwardly opening channel members 20 and 21 as shown in FIG. 8. Thus, the channel members 20 and 21 comprise tracks for guiding movement of the trolleys or pusher dogs 16 as the chain and trolleys move through the housing 17. As further shown in FIG. 8, a lug 29 is provided on the chain 15 for attaching the trolley carriage 23 to the chain 15.

In the subfloor conveyor system of this invention there are employed two means for effecting disengagement of the material handling trucks from the dragline disposed beneath the surface of the floor. One such means is in the form of the usual handle or foot lever, and the second shall be termed an automatic disengagement. The automatic disengagement includes for its actuation a ramp 30 (FIGS. 2, 3, and 9) which is hingedly mounted in the floor 10 and is capable of being wholly depressed within the floor, as shown in FIGURE 2, or raised out of the floor, as shown in FIGURE 3, for engagement by mechanism on the underside of the material handling truck. As best shown in FIGURE 9, the floor ramp 30 includes laterally spaced apart sides 31 and 32 which when the ramp is above the floor have uniformly inclined upper surfaces. The floor ramp 30 is hinged or pivoted, as at 33 (FIGS. 2 and 3), to permit the swinging movement from a subfloor position to a position above the surface of the floor. As best shown in FIGURE 9, the hinge or pivot consists of spaced apart axially aligned hinge pins 34 and 35. The ramp further consists of downwardly projecting side extension plates 36 and 37 joined at their lower ends by a cross member 38. The cross member 38 is welded at 39 to the depending extension 36 and welded at 40 to the depending extension 37. A centrally disposed lug 41 is welded at 42 on the cross member 38 so that it constitutes a rigid part of the ramp apparatus 30. A clevis 43 is shown engaging the lug 41 by means of a cross pin 44, the clevis being mounted on the upper end of a piston rod 45 which in turn is reciprocably actuated by means of a fluid operated cylinder 46.

The ramp 30 is equipped with notch means 47 such as shown in diagrammatic form in FIGS. 2 and 3. The notch means 47 comprises aligned notches 48 and 49 in the side plates 31 and 32, respectively, as shown in FIG. 9. A later portion of this specification describes the function of the inclined floor ramp 30 and its notch means 47 to effect a disengagement of the drive engaging element of the material handling truck and a halting of forward movement of that material handling truck.

The transversely extending hinge pin 34 is welded or otherwise fastened to a longitudinally disposed rectangular block member 50 (FIG. 9), and the transversely disposed axially aligned but spaced apart pin 35 is welded or otherwise fastened to a similar longitudinally extending rectangularly shaped block 51 (FIGS. 3 and 9). The block members 50 and 51, the ramp sides 31 and 32, and the lower extensions 36 and 37 flank the sides of the dragline housing 17. The block 50 is slidably mounted on a longitudinally extending shaft 52, and the block 51 is longitudinally slidable on a shaft 53 on the other side of the housing 17. A retaining collar 54 acts to hold the block 51 on the shaft 53 and it in turn is held in position on the shaft 53 by means of a cotter-pin 55 passing through the shaft at the end thereof, as shown in FIG. 3. The shaft 53 is also provided with a spaced apart collar 56 and a cotter-pin 57 or the like at the other end of the shaft to thus hold the collar 56 from endwise removal from the shaft 53. A coil spring 58 is mounted on the shaft 53 and is disposed intermediate the block 51 and the end collar 56. A corresponding spring 59 is mounted in similar fashion on the shaft 52 on the other side of the dragline housing 17. Thus, the ramp 30 is spring-cushioned against longitudinal movement, as hereinafter described.

As shown in FIG. 9, a track assembly 60 is provided for the block 50 and a similar track assembly 61 is provided for the block 51. The track assembly 60 includes a first angle member 62 to which the retaining collar 54 is integrally fastened either by means of welding or other fastening means. A second angle member 63 is welded to the underside of the first angle member 62 and a third angle member 64 is fastened to the second angle 63 on one side thereof. The three angle members form the unitary assembly 60 which in turn is welded at 65 to the bottom of the inwardly opening channel 20. Thus the track assembly 60 for the ramp hinge mounting is integral with the dragline housing 17. The track assembly 61 on the other side of the housing 17 is similar in construction to the track assembly just described and includes a first angle 66, a second angle 67, and a third angle 68, all welded in the same relationship as the angle members 62, 63 and 64. The welded assembly 61 is in turn fastened to the bottom of the inwardly opening channel 21. The end collars 54, as previously stated, are affixed to the track assemblies 60 and 61 thus providing for a fixed longitudinal positioning of the shafts 52 and 53. By means of the springs 58 and 59, the hinge pins 34 and 35 of the ramp 30 are permitted limited longitudinal movement to the extent of the compression of the springs by the block members 50 and 51. The ramp is thus spring biased in a direction opposite to the direction of travel of the truck to be driven. It will later be described how the cushioning action of the springs 58 and 59 will obviate any undue jarring of the mechanism when the heavy high-speed material handling truck used in conjunction with this system is brought to a stop.

Figure 6:
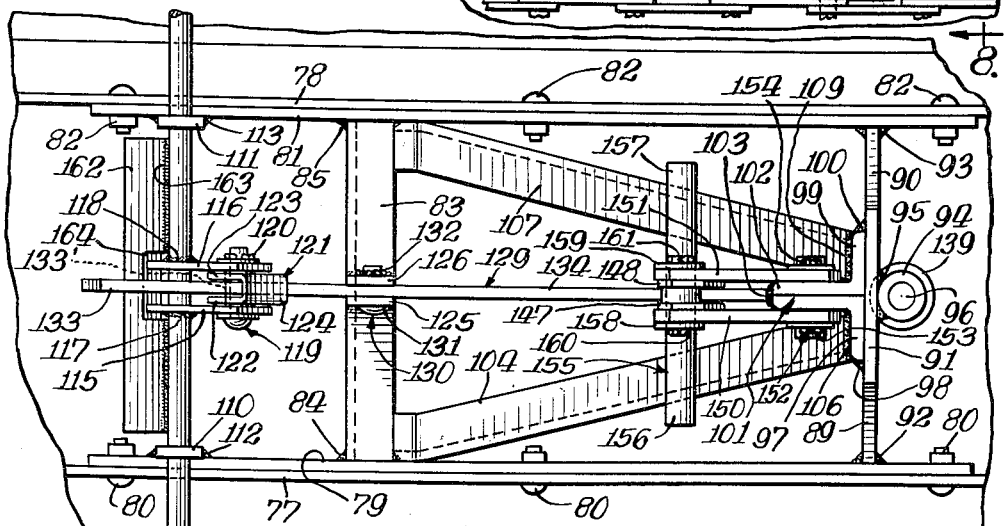
FIGURE 6 is a bottom plan view of the structure shown in FIG. 5.

A material handling truck 70 (FIG. 7) is provided with floor engaging wheels at each corner of the truck. One such wheel is shown at 71 on a caster mounting 72. A spaced apart wheel 73 is shown at the other front corner of the truck and in turn is mounted on a caster mounting means 74. The caster-mounted wheels permit the material handling truck to follow the sub-floor draglines for each of the conveyor systems 11, 12 and 13 shown in FIGURE 1. The truck 70 is equipped with a bed 75 which is reinforced around its periphery with a contoured angle member 76. The underside of the bed 75 is provided with longitudinally extending spaced apart angle members 77 and 78 which act as reinforcing members for the truck bed 75 as well as to provide attaching means for the linkage mechanism used in this invention. A longitudinally extending vertically disposed reinforcing plate 79 abuts the downwardly projecting side of the angle 77 and is fastened thereto by bolt means 80 (FIG. 6). A similar reinforcing plate 81 extends longitudinally of the truck in abutting relationship to the downwardly projecting side of the angle 78 and is secured thereto by bolt fastening means 82. A transversely disposed angle member 83 is welded at 84 to the plate 79 and is welded at 85 to the plate 81. The angle member 83 thus spans the longitudinally disposed angle reinforcing members 77 and 78 and forms a horizontally disposed H frame which gives rigid reinforcement to the truck bed understructure. Bolt means 86 (FIG. 8) are shown fastening the angle 77 to the truck bed 75 and bolts 87 are shown fastening the angle 78 to the bed 75.

Figure 7:
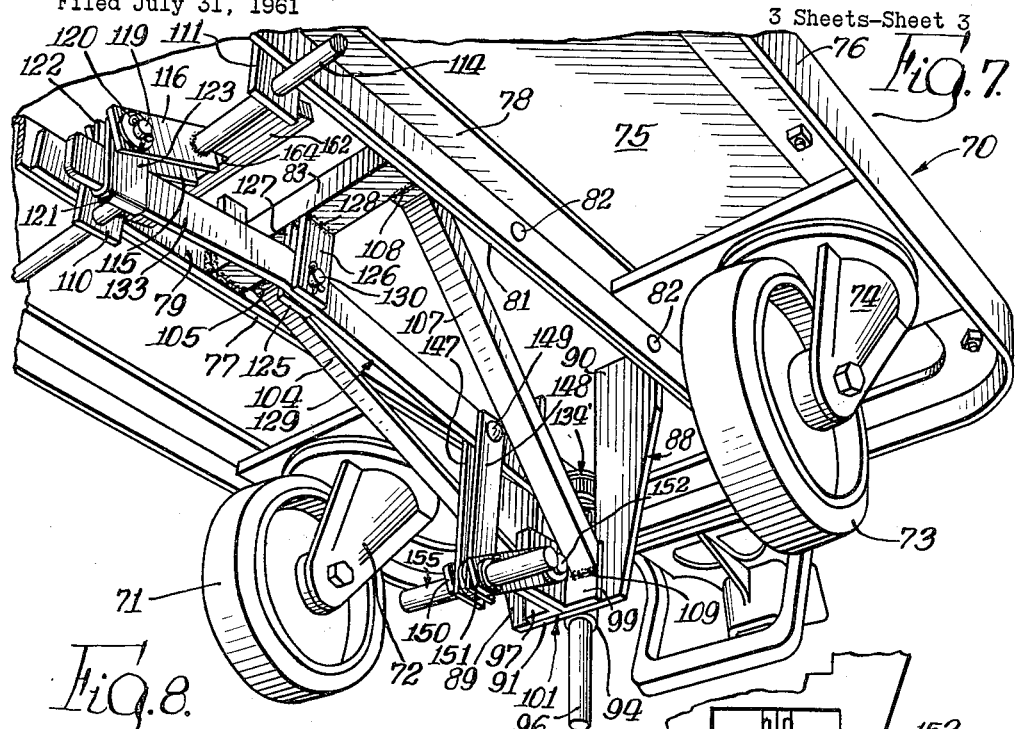
FIGURE 7 is a perspective view showing the underside of the material handling truck illustrated in FIGS. 5 and 6.

As shown in FIGS. 6 and 7, a U-shaped yoke member 88 having spaced sides 89 and 90 and across or adjoining bottom 91 is weldably attached at 92 to the reinforcing plate 79 of the angle 77 and is weldably attached at 93 to the reinforcing plate 81 of the angle 78. A vertically disposed sleeve journal 94 is welded at 95 to the bottom or adjoining member 91 of the yoke 88. The sleeve 94 constitutes a slidable socket for a tow pin 96 which physically engages the subfloor dragline to impart movement from the dragline to the truck. The tow pin 96 is slidable vertically in the sleeve 94 and it is this vertical movement of the tow pin which effects engagement or disengagement with respect to the dragline.

An angle member 97 (FIGS. 6 and 7) is vertically disposed so that one face thereof abuts and is welded, as at 98, to the lower cross member 91 of the yoke 88 opposite the attachment of the sleeve 94. A second angle member 99 is also vertically disposed in back-to-back relationship with the angle 97 and is also welded, as at 100, to the bottom 91 of the yoke member 88. The two abutting angles 97 and 99 constitute a T member 101 with the outwardly projecting leg portion thereof forming a central linkage attaching pad 102. A weld 103 rigidly joins the longitudinally extending abutting legs of the attaching pad 102 thereby providing added reinforcement to the tow pin mounting for resisting any tendency for the vertically disposed sleeve socket 94 or the tow pin 96 to shift or twist in any direction.

The yoke member 88 is reinforced by a diagonal brace 104 which extends between the transversely disposed angle member 83 and the angle 97 and is rigidly secured thereto, as by welding at 105 and 106. A second complementary diagonal brace 107 is welded to the angle 83 at 108 and to the angle 99 to 109. The pair of brace members 104 and 107 flank the intermediately disposed T member 101 and act to firmly brace the yoke member 88 and the sleeve 94 which it carries. The bracing 104 and 107 prevents longitudinal shifting of the tow pin socket 94 and, by reason of the angular disposition of the brace arms, also retains the socket 94 against lateral shifting.

Transversely aligned brackets 110 and 111 are welded respectively at 112 to the plate 79 of the angle 77 and at 113 to the reinforcing plate 81 of the angle 78. The brackets 110 and 111 thus depend from the longitudinally extending angles 77 and 78 for journaling a cross shaft 114. Spaced apart crank arms in the form of plates 115 and 116 are welded at 117 and 118, respectively, to a central portion of the shaft 114 between the carrying or hanger brackets 110 and 111. A pin or rivet 119, parallel to the cross shaft 114, passes through the outwardly extending ends of the plates 115 and 116. A cotter pin 120 extends through the end of the pin 119 and holds the pin in fixed position with respect to the plates 115 and 116. A bail-like member 121 with parallel sides 122 and 123 and an adjoining bottom 124 has its sides swingably supported on the pin 119 between the spaced plates 115 and 116. The bottom 124 of the bail 121 is located generally beneath the spaced plates 115 and 116.

Spaced apart lugs or bracket members 125 and 126 are fastened by means of welds 127 and 128 to the cross angle member 83 and project downwardly therefrom to provide a support for a longitudinally extending lever arm 129. A pivot pin 130 passes through the spaced lugs 125 and 126 and the intermediately disposed lever arm 129 and provides fulcrum means for the lever 129. The hinge pin 130 has an enlarged head 131 on one end, and a removable cotter-pin 132 locks the other end of the hinge pin 130 in this assembled relationship.

The lever 129 has a rearward extension 133 which projects through the bail member 121 and is arranged for actuating engagement at its upper edge with a transversely extending tubular member or roller 133′ (FIG. 6) mounted loosely on the pin 119 between the plates 115 and 116. The lever arm 129 also has a forward extension 134 which mounts a generally semi-circular yoke member 134′ for operatively engaging the tow pin 96. The yoke 134′ has inturned ends 135 and 136 (FIG. 8) and a rearwardly extending attaching leg 137 which is secured to the lever arm 129 by means of bolts 137′ extending through the leg 137 and the forward lever portion 134. A pair of vertically spaced collars 138 and 139 are rigidly provided on the upper portion of the tow pin 96 by means of weld attachments at 140 and 141 (FIG. 5), thereby defining an annular groove 142 which receives the yoke ends 135 and 136 in loosely straddling relation at opposite sides of the tow pin (FIG. 8).

The cross shaft 114 is journaled at its opposite ends in a pair of depending brackets, one of which is indicated at 145 in FIG. 6 and is secured to the peripheral angle reinforcing member 76 of the material handling truck bed by means of screws 146. A pair of depending pedals or foot levers are rigidly mounted adjacent the end of the shaft 114, one of the pedals being shown at 143 in FIG. 5 and having a welded connection 144 to the shaft 114. When the pedal 143 is moved to its forwardmost position, as shown in full lines in FIG. 5, the shaft 114 and the crank arms 115 and 116 are rotated in counterclockwise direction thereby engaging the tube 133′ with the upper edge of the arm portion 133 so as to pivot the arm portion 133 downwardly and elevate the arm portion 134. This movement causes lifting of the tow pin 96 through the yoke 134′ to its uppermost position so that the lower end of the tow pin is above the floor 10 thereby completely freeing the truck from the conveyor system. In this condition, the crank arms 115—116 are beyond their dead-center position and the tube 133′ engages a stop block 146′ rigidly mounted on the upper edge of the arm portion 133. When the pedal 143 is moved in the opposite or rearward direction, the lever 129 pivots in the opposite or clockwise direction, as shown in broken lines in FIG. 5, both by the action of gravity and by the lifting action of the bail 121 thereupon causing the tow pin 96 to be lowered into engagement with the subfloor trolley 16 and thus causing the truck 70 to be connected to the conveyor.

As shown in FIGS. 5 and 7, a pair of spaced parallel links 147 and 148 are hingedly mounted by means of a pin 149 to the lever 129 between the fulcrum 130 and the tow pin interconnection. As shown in FIG. 6, a pair of spaced parallel link arms 150 and 151 are hingedly mounted on the T pad 102 by a hinge pin 152 having an enlarged head 153 at one end and a locking cotter pin 154 at the other end. As shown in FIG. 5, the link arms 150 and 151 are disposed in a generally rearward direction from the T pad 102. A cross bar 155 acts as a hinge connecting pin between the generally downwardly depending links 147 and 148 and the generally rearwardly extending link arms 150 and 151. The cross bar 155 includes lateral extensions 156 and 157 to provide ramp-engaging means as will later be discussed. Washers 158 and 159 are provided on the cross bar 155 adjacent the outer sides of the arms 150 and 151 and are held in assembled position by cotter pins 160 and 161 which pass through the cross bar 155.

As shown in FIGS. 5 and 6, a generally transversely disposed counterweight 162 is weldably fastened at 163 to the central portion of the cross shaft 114 between the angle members 77 and 78. A notch 164 in the counterweight 162 provides for the assembly of bracket plates 116 and 117 which are welded to the shaft 114 at a position disposed centrally of the notch 164. The counterweight 162 facilitates operation of the foot pedals 143 and also holds the pedals in either of their extreme positions past dead-center.

In describing the operation of the device of this invention, the floor plan of FIG. 1 may be considered representative of numerous subfloor conveyor systems as used in shops, warehouses, or the like. A first conveyor system is shown at 11 and constitutes a complete circuit in which a dragline is located beneath the surface of a floor at a position adjacent a narrow slot 14 on the floor. By means of trolleys or the like on the dragline, trucks 70 may be driven throughout the endless path of the dragline. However, it is often desirable to shift the trucks from one such system to another, such as from the system 11 to a companion system 12 having its own separate dragline. This is accomplished by employing an intermediately disposed smaller subfloor conveyor loop 13 which also has its own separate dragline. Suitable interconnections are provided by a switch 166 leading from the first system 11 to the smaller system 13 and by another switch 167 leading from the smaller loop to the second conveyor system 12. In effecting transfer of a truck, the switch 166 when in appropriate switching position causes temporary disengagement of the truck tow pin from the dragline of conveyor system 11 and the truck coasts under its own momentum across the switch 166 to the loop 13 where the truck tow pin is automatically engaged by the dragline of loop 13. Similarly, at switch 167 the truck tow pin is temporarily disengaged from the dragline of loop 13 and is engaged by the dragline conveyor system 12 after coasting across the switch 167.

FIG. 1 shows a plurality of trucks 70 in the second conveyor system 12 several of which are approaching the switch 167. When the system is crowded as shown, it may be necessary to halt the movement of a truck 70 from the intermediate loop 13 to the conveyor 12 until such time as there is a suitable gap on the conveyor 12 to receive the additional truck. In accordance, with the present invention, this is accomplished by means of a liftable ramp 30 located on the loop 13 between the switches 166 and 167 which cooperates with the special linkage 147—148—150—151 and the cross bar 155 to effect disengagement of the truck tow pin 96 from the dragline of loop 13 and also to bring the truck to a complete stop for the desired period of time. Frequently the trucks used are heavy and move at relatively high speed so that mere disengagement of the truck tow pin from the dragline would still allow the truck to roll under its own momentum. The present invention obviates such difficulties not only by disengaging the trucks from the subfloor dragline but also by halting all further movement of the trucks immediately. The sudden stopping of such large masses necessitates a substantial frame structure and associated linkages.

As illustrated in FIG. 3, the piston and cylinder mechanism 45—46 is energized through suitable manual or automatic controls (not shown) to raise the ramp 30 about its pivot 33 so that the upper edges of the ramp side plates 31—32 are inclined upwardly and forwardly. The material handling truck 70 having its tow pin 96 in the recess 24 of the trolley 16 is being forwardly driven through the narrow floor opening in the conveyor system 13 until it reaches the position of the inclined floor ramp 30, whereupon the cross bar 155 through the medium of its outwardly extending ends 156 and 157 rides up the inclined edges of the spaced side plates 31 and 32 of the ramp 30 causing an upward camming or lifting of the cross bar 155 as shown in the successive dotted line positions of movement of the cross bar 155 in FIG. 3. The initial raising of the cross bar 155 imparts an upward movement to the link arms 147 and 148 which in turn through the pin 149 causes pivoting of the lever arm 129 about its fulcrum 130 and raises the forward end 134 of the lever arm thereby lifting the vertically slidable tow pin 96 from its engagement with the trolley socket 24. This action effectively disengages the material handling truck 70 from its source of driving power, but, as previously stated, the inertia of the truck in its forward movement tends to continue and the truck, unless otherwise stopped, would continue rolling forwardly. However, the cross bar 155 rises to the top of the ramp 30 and, as shown in FIGS. 3 and 9, drops into the notch 47 which immediately acts to hook the material handling truck 70 to the floor ramp 30. Under the inertia of the moving truck, the ramp 30 shifts forwardly a slight distance against the cushioning action of the springs 58—59 and the truck is halted when the springs are fully compressed. At this point, the force of impact on stopping of the truck is imposed on the links 150—151 which are thereby placed in tension, and the force is distributed throughout the rugged framework including the T member 101, the yoke 88, the braces 104—107, and the H frame 77—78—83.

There is thus provided a means for remotely effecting disengagement of the tow pin 96 from the subfloor dragline, but, as will be evident from FIG. 3, the tow pin is in an intermediate position between its extreme upper and lower positions shown in FIGS. 2 and 4. In other words, the tow pin 96 in FIG. 3 is disconnected from the conveyor but the pin still extends below the floor level into the slot 14 so that the truck is in proper position for rapid reengagement with the conveyor. To effect such reengagement, the ramp 30 is lowered by withdrawal of the piston rod 45 into the cylinder 46 whereupon the cross bar 155, the links 147—148, and the tow pin 96 are permitted to drop downwardly so that the lower end of the tow pin is in the path of movement of the dragline. It will be understood that movement of the trolleys 16 with their inclined surfaces will cause the tow pin 96 to ride upwardly into the notch 24, whereupon the truck 70 resumes movement with the dragline as shown in FIG. 2.

The remote location of the braking cross bar 155 rearwardly of the tow pin 96 and the use of the intermediate linkage 147—148—150—151 prevents the imposition of excessive stopping forces on the tow pin which might cause bending or breakage of the tow pin if the impact forces were imposed directly on the tow pin. Also, the horizontal force component created by the sudden stopping of the moving truck is assimilated by and distributed through the strong framework on the under side of the vehicle, particularly the T 101, the yoke 88, the braces 104—107, and the H frame 77—78—83. Furthermore, with the present arrangement forces are imposed on the tow pin only unidirectionally during engagement of the pusher dogs with the tow pin. Thus, repeated stressing of the tow pin in reverse directions is avoided thereby lengthening the life of the tow pin.

In addition to the automatic engagemtnt and disengagement of the tow pin relative to the conveyor dragline by operation of the floor ramp 30 as described above in connection with FIGS. 2 and 3, complete removal of the truck can be effected through the foot pedals 143 as heretofore described in detail in connection with FIGS. 5 and 6. Thus, as also shown diagrammatically in FIG. 4, the tow pin 96 can be lifted completely free of the slot in the floor 10. Both the ramp-actuated linkage means and the pedal operated connections are superimposed on and act to swing the elongated lever 129 about its fucrum thus causing engagement or disengagement of the truck's tow pin with respect to the subfloor dragline.

It should be understood that numerous details of construction may be varied without departing from the principles disclosed herein and without departing from the scope of the invention as defined in the appended claims.

We claim:

1. In a floor truck for a subfloor conveyor system having a vertically movable tow pin for engagement and disengagement relative to a subfloor drive line, the improved means for automatically disengaging the tow pin from the drive line and stopping the truck which comprises linkage means pivotally supported at the underside of the truck and operatively connected to the tow pin for lifting the tow pin, and abutment means carried by said linkage means remote from the tow pin for engaging and sliding upwardly along an inclined structure having a cooperating abutment means disposed in the path of movement of the truck.

2. In a floor truck for a subfloor conveyor system having a tow pin, support means mounting the tow pin in vertically reciprocable relation at the underside of the truck, and lever means for raising and lowering the tow pin to effect engagement and disengagement thereof with respect to a subfloor drive line, the improved means for automatically disengaging the tow pin from the drive line and stopping the truck which comprises linkage means pivotally connected to the lever means for actuating the latter, and abutment means carried by said linkage means remote from the tow pin and adapted to be engaged by upwardly inclined structure having a cooperating abutment means and disposed in the path of movement of the truck.

3. In a floor truck for a subfloor conveyor system having a tow pin, support means mounting the tow pin in vertically reciprocable relation at the underside of the truck, and lever means for raising and lowering the tow pin to effect engagement and disengagement thereof with respect to a subfloor drive line, the improved means for automatically disengaging the tow pin from the drive line and stopping the truck which comprises first link means pivotally connected to the lever means, second link means pivotally connected to the support means, and cross bar means pivotally interconnecting said first and second link means, said cross bar means being adapted to engage and slide upwardly along inclined structure disposed in the path of movement of the truck and having recess means for receiving and retaining said cross bar.

4. In a floor truck for a subfloor conveyor system having a framework at the underside of the truck and a vertically movable tow pin supported by said framework for engagement and disengagement relative to a subfloor drive line, the improved means for automatically disengaging the tow pin from the drive line and stopping the truck which comprises, in combination, an elongated lever having a fulcrum support from the framework, said lever having means at one end thereof engaging the tow pin for raising and lowering the tow pin, linkage means pivotally connected to the framework and pivotally connected to said lever intermediate said one end thereof and said fulcrum support, and actuating means carried by said linkage means remote from the tow pin for engaging and sliding upwardly along an inclined structure disposed in the path of movement of the truck and having abutment means adapted to be engaged by and to retain said actuating means.

5. The device of claim 4 further characterized in that said linkage means comprises first link means pivotally connected at one end thereof to said lever intermediate said one end of said lever and said fulcrum support, and second link means pivotally connected at one end thereof to the framework, the opposite ends of said first and second link means having a pivotal connection, and said actuating means being mounted on said linkage means adjacent said pivotal connection.

6. In a floor truck for a subfloor conveyor system having a framework at the underside of the truck including sleeve support means, a tow pin mounted in said sleeve support means for vertical movement, and lever means having a pivotal support on said framework and operatively engaging said tow pin for raising and lowering the tow pin to effect engagement and disengagement thereof with respect to a subfloor drive line, the improved means for automatically disengaging the tow pin from the drive line and stopping the truck which comprises first link means pivotally connected at one end thereof to the sleeve support means and extending away from the tow pin, second link means pivotally connected at one end thereof to the lever means intermediate the tow pin and the pivotal support for said lever means and extending toward said first link means, and a transverse cross bar pivotally interconnecting the opposite ends of said first and second link means, said cross bar having end portions extending beyond said link means and adapted to engage and slide upwardly along an inclined ramp disposed in the path of movement of the truck and having recess means for receiving and retaining the cross bar end portions, whereby said second link means is shifted upwardly for lifting the lever means and thereby disengaging the tow pin and whereby the impact force on stopping the truck is imposed on the framework through said first link means which is placed in tension upon engagement of the cross bar end portions in the ramp recess means.

7. In a floor truck for a subfloor conveyor system having a framework at the underside of the truck, a tow pin supported on said framework for vertical movement for engaging and disengaging a subfloor drive line, elongated lever means having an intermediate fulcrum support from the framework and having at one end thereof an operating connection with said tow pin for raising and lowering the same, and actuating pedal means cooperable with the opposite end of said lever means, the improved means for further actuating the lever means which comprises first link means pivotally connected to the lever means intermediate said one end thereof and said fulcrum support for lifting the tow pin without actuation of the pedal means, second link means pivotally connected to said first link means and to the framework, and combined lifting and stop means carried by at least one of said link means and adapted to engage and slide upwardly along inclined structure disposed in the path of movement of the truck and having cooperating stop means adapted to be engaged by said combined lifting and stop means for automatically disengaging the tow pin and stopping the truck.

8. In a floor truck for a subfloor conveyor system having a framework at the underside of the truck, and a tow pin supported on said framework for vertical movement for engaging and disengaging a subfloor drive line, the improvement comprising, in combination, an elongated lever having a fulcrum support from the framework intermediate the ends of the lever, means providing an operating connection between one end of said lever and the tow pin, pedal actuated means cooperable with the opposite end of said lever for manually moving the tow pin between extreme upper and lower positions, and automatic actuating means connected to said lever intermediate said one end thereof and said fulcrum support, said automatic actuating means being engageable with inclined structure disposed in the path of movement of the truck for automatically lifting the tow pin to a position of disengagement intermediate said extreme upper and lower positions.

9. The device of claim 8 further characterized in that said automatic actuating means comprises liftable linkage pivotally connected to the framework and to said lever, and means carried by said linkage for engagement with the inclined structure.

10. The device of claim 8 further characterized in that said automatic actuating means comprises first link means pivotally connected at one end thereof to said lever, second link means pivotally connected at one end thereof to the framework, and a cross bar pivotally connecting the opposite ends of said first and second link means, said cross bar having projecting end portions engageable with the inclined structure for lifting the tow pin and receivable in recesses in the inclined structure for stopping the truck.

References Cited in the file of this patent

UNITED STATES PATENTS 2,737,902     Folsom _____ Mar. 13, 1956